United States Patent Office 3,525,157
Patented Aug. 25, 1970

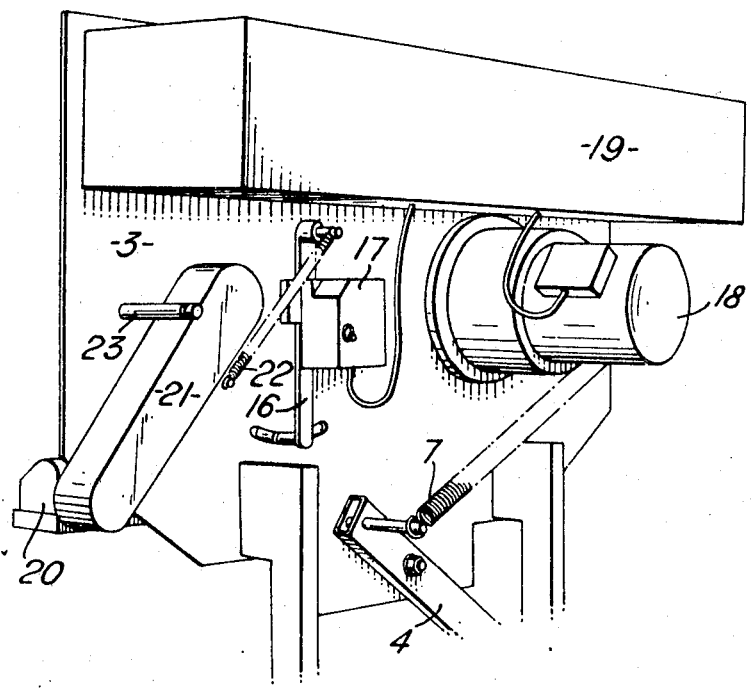

3,525,157
APPARATUS FOR MEASURING LENGTHS
Peter Harvey, London, and Dennis Joseph Nash, Southall, England, assignors to British Insulated Callender's Cables Limited, London, England
Filed Aug. 7, 1967, Ser. No. 658,860
Claims priority, application Great Britain, Aug. 18, 1966, 37,064/66
Int. Cl. G01b 5/04
U.S. Cl. 33—129         8 Claims

ABSTRACT OF THE DISCLOSURE

Length measurements are made using as a measuring member a flexible tape which is locally held by a pressure member against the surface along which the measurement is to be made during relative movement in the direction of measurement between the apparatus and the surface. The tape is taken from a supply roll containing a length of the tape greater than the length to be measured and is fed by positive driving means to the pressure member. The driving means is controlled in accordance with the tension in the tape between the supply roll and the pressure member to maintain that tension substantially constant. The measurement required is obtained by registering the rotation of a capstan over which the tape passes in its path between the supply roll and the surface.

---

Figure 1:
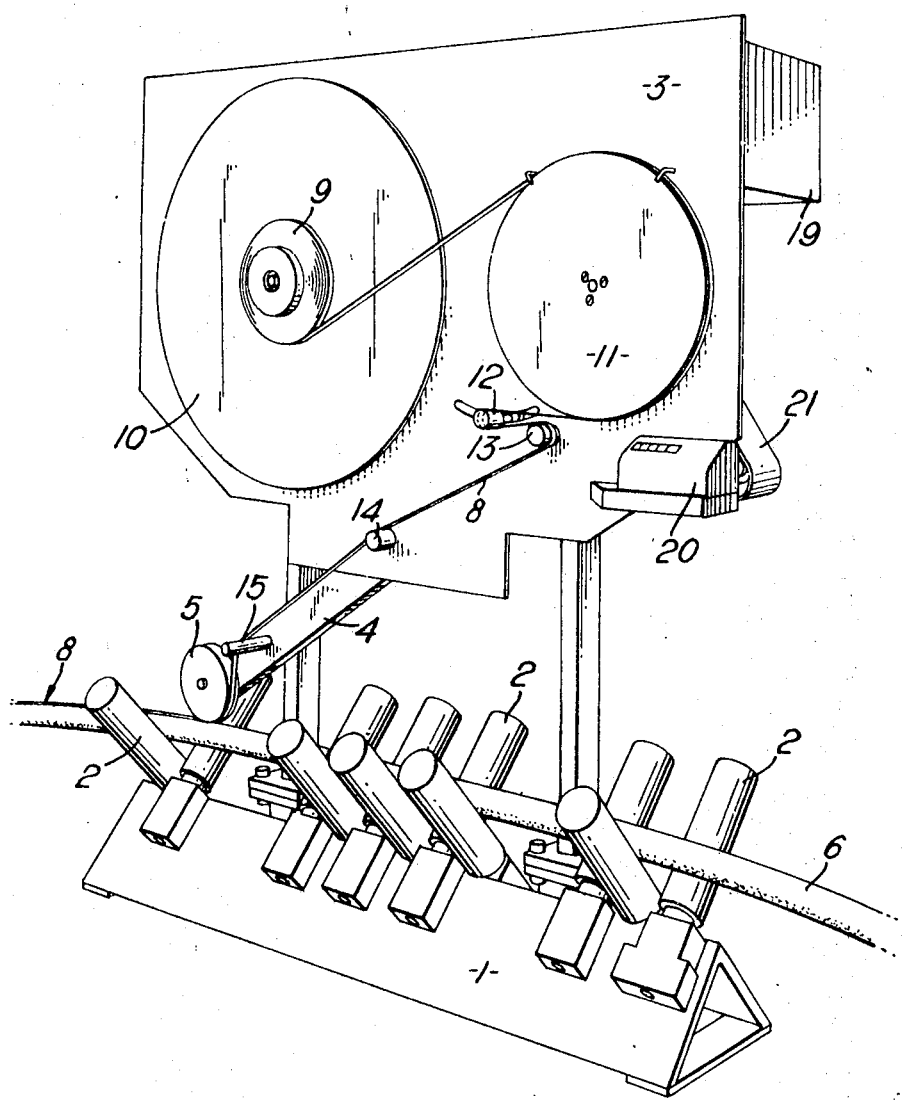

This invention relates to an apparatus for length measuring in which during relative movement, in the direction of measurement, between the apparatus and a surface along which a length is to be measured, a measuring member is held in contact with the surface. In conventional apparatus of this kind the measuring member is a measuring wheel which is rotated by direct contact with the surface during this relative movement and which operates a counter or recording device to indicate the extent of the movement and the length to be measured.

The apparatus in accordance with the invention comprises a tape supply reel, a pressure member for holding the tape locally against the surface, and positive driving means upstream of the pressure member for feeding the tape from the supply reel to the pressure member. Sensing means responsive to the tension in the tape is interposed in the path of the tape between the tape driving means and the pressure member, and means are provided for controlling the driving means in dependence on the tension so measured in such a way as to maintain the tension substantially constant as relative movement in the direction of measurement takes place between the pressure member and the surface and hence between the pressure member and the tape. The apparatus further includes means for continuously measuring the length of tape passing from the supply reel to the pressure member. Preferably the supply reel constitutes the driving means, the means for measuring the length of the tape comprises a capstan around which the tape passes in its path between the supply reel and the pressure member and the pressure member is a roller biased towards the surface to be measured. The tension sensing device is then made responsive to the tension in the part of the tape passing from the capstan to the pressure member.

The supply reel is preferably a tape pad driven by a reversible electric motor, the power supply for which is at least partly derived from an electronic amplifier having in its input circuit a variable impedance actuated by the tension sensing device and having its output circuit so connected to the reversible motor that when the impedance is above a predetermined value the motor is energised for rotation in a forward direction and when the impedance is below that value the motor is energised for rotation in a reverse direction.

The apparatus in accordance with the invention is especially applicable to the measurement of rough surfaces and surfaces which might contaminate a measuring wheel held directly in contact therewith to the extent that its effective diameter is changed, for example the surface of an electric power cable, and the invention will be further illustrated by a description by way of example with reference to the accompanying drawings of apparatus for measuring the length of an electric power cable passing longitudinally over suitable supporting and guiding rollers.

In the drawings:
FIG. 1 is a perspective view of the front of the apparatus, and
FIG. 2 is a perspective view of part of the back of the apparatus.

The apparatus is supported on a base 1 carrying guide rollers 2 and comprises a base plate 3 from which a pivoted arm 4 carrying a pressure roller 5 projects downwards to make an acute angle with the axis of a cable 6 when the roller 5 is in contact with the upper surface of the cable 6 with its axis transverse to the cable axis. When in its operative position, the arm 4 is biased towards the cable 6 by a spring 7 with a force sufficient to hold the pressure roller 5 firmly and continuously in contact with the cable 6.

The tape 8 used is paper tape of width ⅜" and thickness 0.004"–0.007". The tensions applied to the tape when the apparatus is functioning normally are such that its strength is not critical although it may be advantageous to use a tape that will break when abnormal conditions arise. It is carried in the form of a supply roll 9 on a support 10 mounted on the base plate 3 in a vertical plane passing through the cable axis. From the supply roll 9 the tape 8 passes over a measuring capstan 11 mounted on the same plane as the supply roll 9 and from the capstan 11 it passes over guide rollers 12–15 having horizontal axes. The axis of the roller 14 is approximately co-axial with the axis about which the pressure arm 4 pivots. From the guide roller 15 the tape 8 passes onto the upper surface of the cable 6, around the pressure roller 5 and between the roller 5 and the upper surface of the cable, in the direction of movement of the cable.

The surface of the capstan 11 may be knurled or roughened or made of a high friction substance and the tape 8 preferably makes at least half a turn around the capstan 11.

The roller 12, about which a loop of tape between the capstan 11 and the guide roller 13 passes is a dancer roller of a tension sensing device of the kind described in the specification of U.S. Pat. No. 3,233,397. The dancer roller 12 is carried on an arm 16 pivoted on the spindle of a rheostat or other variable impedance carried in the casing 17 and is biased by a spring 22 in such a way as to exert a substantially constant force on the loop of tape passing around the dancer roller 12 for all positions of the arm over a limited arc. The support 10 is driven by a reversible electric motor 18 controlled by the tension sensing device in the manner described in that specification, the amplifier and anciliary equipment for supplying power to the motor being housed in the casing 19.

The capstan 11 is coupled to a mechanical counter 20 calibrated to indicate cable length, by a chain drive protected by a casing 21.

Alternatively the capstan 11 can be coupled to a continuous recording electro-magnetic counter via a cam on its shaft which operates electric contacts.

The counter may if desired operate an audio and/or visual signalling device for indicating when a predetermined length of the tape 8 has passed over the capstan 11 and an audio and/or visual warning device for indicating when the passage of that length is almost complete.

The motor 18 driving the tape supply roll support 10 is set to feed the tape 8 at a linear speed equal to the linear speed of the cable. The response of the servo system is such that, when the capstan 11 accelerates owing to an increase in tension in the tape passing over the dancer roller 12, the tape 8 does not slip on the capstan. This response is obtained electrically or mechanically, e.g. by altering the inertia of the motor.

Over acceleration of the cable causes the tape 8 to break. If over-deceleration of the cable should take place, that is deceleration greater than the servo system can accommodate, the dancer pulley moves to the zero tension position of the sensing device, and operates a switch mounted in the casing 17 to switch off the servo motor and allow the tape to over-spill. Thus faulty operation is visually indicated.

At the beginning of a measuring operation, with the tape threaded as described and the pressure roller 5 in contact with the cable, the servo system is energised by back rotation of the tape supply roll support to lift the dancer roller 12 away from the zero tension stop. This causes the tape to be tensioned at about ½ pound. A preselector on the counter 20 is then set for the length desired, the counter is set to zero and the cable drive is started. After the length has been measured the apparatus is reset as described above and further lengths can be measured until the tape supply is exhausted. The apparatus will measure the cable accurately in whichever direction it is moved provided that the tape is fed around the pressure roller 5 to pass between that roller and the surface of the cable in the direction of movement of the cable. Modification of the apparatus in order to measure a cable travelling in the opposite direction to that of the cable 6 can be simply effected by releasing the end of the spring 7 anchored to the base plate 3, swinging the pivoted arm 4 through an angle of approximately 90° until it projects downwards in the opposite direction to make an acute angle with the axis of the cable and attaching the free end of the spring to an anchor rod 23.

In an alternative construction the tape may be held locally against the cable by a pair of parallel pressure rollers, spaced a short distance apart along the cable.

In the apparatus described by way of example, the paper tape is discarded after passing between the pressure roller and the cable surface. The tape could however if desired be rewound for further use after passing between the pressure member and the surface being measured.

A principal advantage of the apparatus in accordance with the invention is that a measuring wheel that comes into contact with the surface to be measured is not used. If a measurnig wheel is used to measure the tape (i.e. the capstan in the example) it can be of light and free running construction. Further advantages are that since the pressure member can be of low intertia the tape can be held by the pressure member firmly and continuously in contact with the surface to be measured, that the tension sensing device reduces any tendency of the tape to snatch and that as the tape is being measured, e.g. by passing over a measuring wheel, it is kept at substantially constant tension whereby tendency for it to slip on such a wheel is inhibited. Also the effect of stretching of the tape between measurement and application to the surface being measured is reduced to a minimum. In the apparatus described by way of example, any stretching of the tape that takes place will occur mainly between the supply roll and the capstan where it is initially tensioned. Between the capstan and the pressure member it is under constant tension and the effect on the measurement of any stretching is reduced to a minimum.

What we claim as our invention is:

1. Apparatus for measuring a length along a surface comprising
   (a) a tape supply reel,
   (b) a pressure member for holding the tape locally against the surface,
   (c) positive driving means upstream of the pressure member for feeding the tape from the supply reel to the pressure member,
   (d) sensing means responsive to the tension in the tape between the tape driving means and the pressure member,
   (e) means for controlling the driving means in dependence on the tension so measured in such a way as to maintain the tension substantially constant as relative movement in the direction of measurement takes place between the pressure member and the surface and hence between the pressure member and the tape, and
   (f) means acting on the tape in its path between the supply reel and the pressure member for continuously measuring the length of tape passing to the pressure member.

2. Apparatus as claimed in claim 1 in which the sensing means is responsive to the tension in the tape between the means for measuring the tape and the pressure member.

3. Apparatus as claimed in claim 1 for measuring the length of an elongated flexible member in which the pressure member holds the tape locally against a surface of said elongated member and means is provided for guiding the elongated member in a longitudinal path with respect to the pressure member.

4. Apparatus as claimed in claim 1 in which the means for measuring the length of tape comprises a capstan around which the tape passes in its path from the supply reel to the pressure member.

5. Apparatus as claimed in claim 1 in which the sensing means comprises a dancer roller over which a loop of the tape passes in its path between the means for measuring its length and the pressure member.

6. Apparatus as claimed in claim 1 comprising
   (a) a reversible electric motor driving the supply reel,
   (b) a power supply for the motor comprising at least in part an electronic amplifier,
   (c) a variable impedance actuated by the tension sensing device in the input circuit of the amplifier and
   (d) an output circuit for the amplifier so connected to the reversible motor that when the impedance is above a predetermined value the motor is energised for rotation in a forward direction and then the impedance is below that value the motor is energised for rotation in a reverse direction.

7. Apparatus as claimed in claim 1 in which the supply reel is a roll of tape lying in the same plane as the direction of measurement.

8. Apparatus as claimed in claim 1 in which the pressure member is a roller biased toward the surface along which the length is to be measured and the tape is adapted to move with the surface between the surface and said roller.

References Cited

UNITED STATES PATENTS

| 473,103 | 4/1892 | Young | 33—129 X |
| 3,015,165 | 1/1962 | Steele | 33—134 |
| 3,233,397 | 2/1966 | Bonikowski. | |

FOREIGN PATENTS 644,295   4/1937   Germany.

ROBERT B. HULL, Primary Examiner

U.S. Cl. X.R.

33—125, 134